US011932193B1

(12) United States Patent
Lopez Martinez

(10) Patent No.: US 11,932,193 B1
(45) Date of Patent: Mar. 19, 2024

(54) VEHICLE INTERIOR PANEL FOR USE OVER A DEPLOYABLE AIRBAG AND METHOD OF MANUFACTURING

(71) Applicant: Faurecia Interior Systems, Inc., Auburn Hills, MI (US)

(72) Inventor: Carlos Gerardo Lopez Martinez, Puebla (MX)

(73) Assignee: Faurecia Interior Systems, Inc., Auburn Hills, MI (US)

(*) Notice: Subject to any disclaimer, the term of this patent is extended or adjusted under 35 U.S.C. 154(b) by 0 days.

(21) Appl. No.: 18/134,532

(22) Filed: Apr. 13, 2023

(51) Int. Cl.
*B60R 21/2165* (2011.01)

(52) U.S. Cl.
CPC .................. *B60R 21/2165* (2013.01)

(58) Field of Classification Search
CPC ............... B60R 21/205; B60R 21/2165
See application file for complete search history.

(56) References Cited

U.S. PATENT DOCUMENTS

| 7,165,780 | B2 | 1/2007 | Segura |
| 7,631,890 | B1* | 12/2009 | Kalisz ................. B60R 21/2165 280/728.3 |
| 7,665,758 | B2 | 2/2010 | Hayashi |
| 8,181,986 | B2 | 5/2012 | Schlemmer |
| 9,481,337 | B2 | 11/2016 | Cowelchuk et al. |
| 11,325,290 | B2* | 5/2022 | Stroebe ............... B29C 37/0057 |
| 2009/0045610 | A1 | 2/2009 | Funakura |
| 2012/0068441 | A1* | 3/2012 | Kalisz ................. B60R 21/2165 280/728.3 |
| 2019/0143929 | A1* | 5/2019 | Lu ....................... B60R 21/2165 280/728.3 |
| 2021/0284095 | A1* | 9/2021 | Jonietz .............. B60R 21/21656 |

FOREIGN PATENT DOCUMENTS

| CN | 112208477 A * | 1/2021 | ............. B60R 21/02 |
| DE | 202019102326 U1 * | 7/2019 | ........... B60R 21/205 |
| DE | 102019218155 A1 * | 1/2021 | ............. B60R 21/02 |
| EP | 1749707 A2 * | 2/2007 | ........ B29C 65/0618 |
| EP | 3730354 A1 * | 10/2020 | ....... B29C 45/14336 |
| WO | WO-9961288 A1 * | 12/1999 | ........ B60R 21/2155 |
| WO | WO-2012160656 A1 * | 11/2012 | ........... B60R 21/205 |
| WO | WO-2015004977 A1 * | 1/2015 | ........ B29C 65/0618 |
| WO | WO-2018005197 A1 * | 1/2018 | ........ B60R 13/0256 |
| WO | WO-2023021894 A1 * | 2/2023 | |
| WO | WO-2023177758 A1 * | 9/2023 | |

* cited by examiner

*Primary Examiner* — Nicole T Verley
(74) *Attorney, Agent, or Firm* — Reising Ethington P.C.

(57) ABSTRACT

A vehicle interior panel for use over a deployable airbag includes an outer substrate portion having a top side, a bottom side, a tear seam, and a structural rib extending from the bottom side of the outer substrate portion. The panel includes an inner substrate portion having a top side, a bottom side, and a deflector extending from the top side of the inner substrate portion. The deflector is configured to contact the structural rib and the tear seam during deployment of the airbag. A method of manufacturing the panel includes injecting the outer substrate portion with the inner substrate portion and folding the inner substrate portion at a hinge region toward the outer substrate portion.

15 Claims, 9 Drawing Sheets

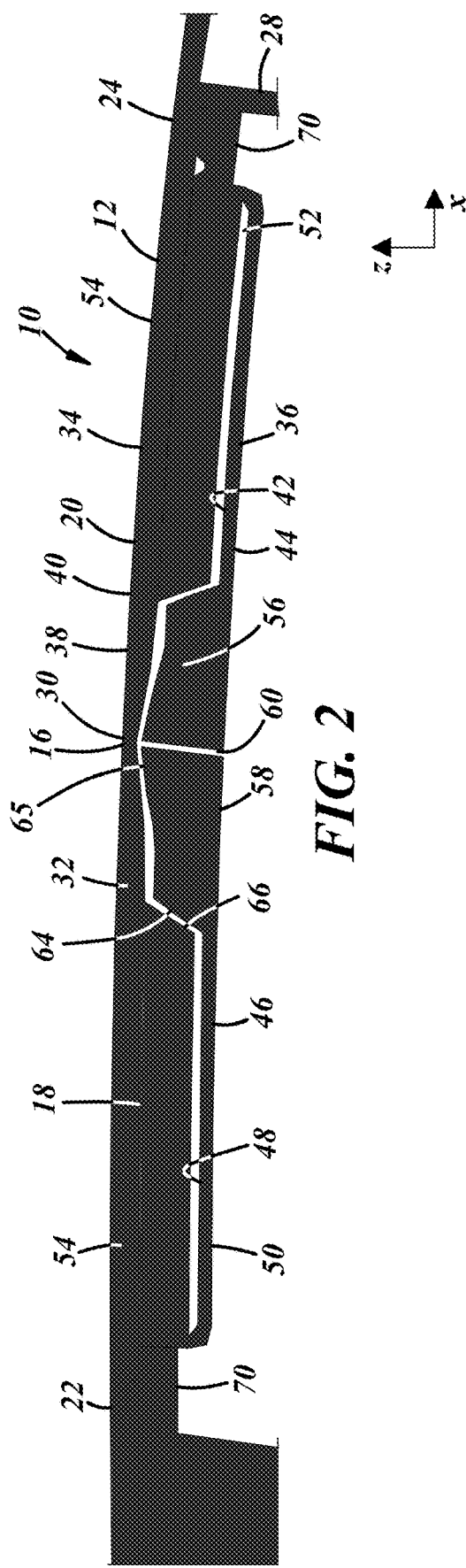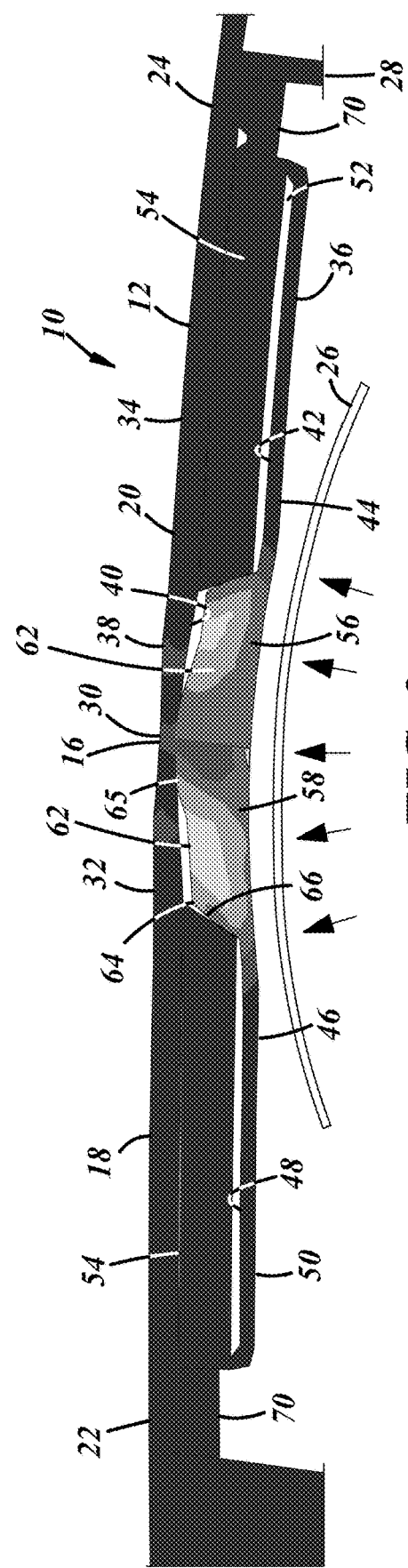

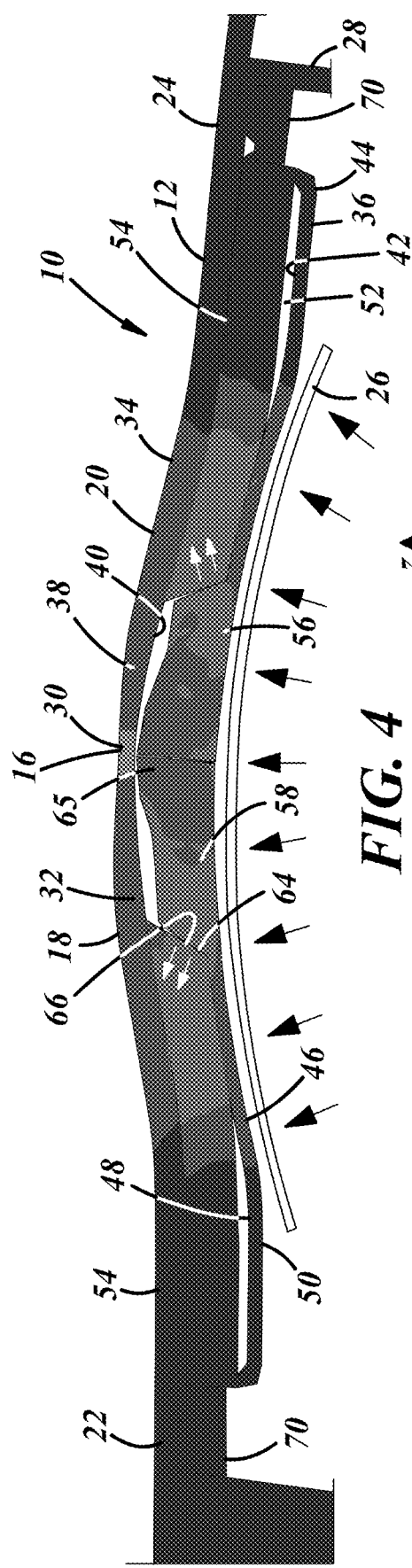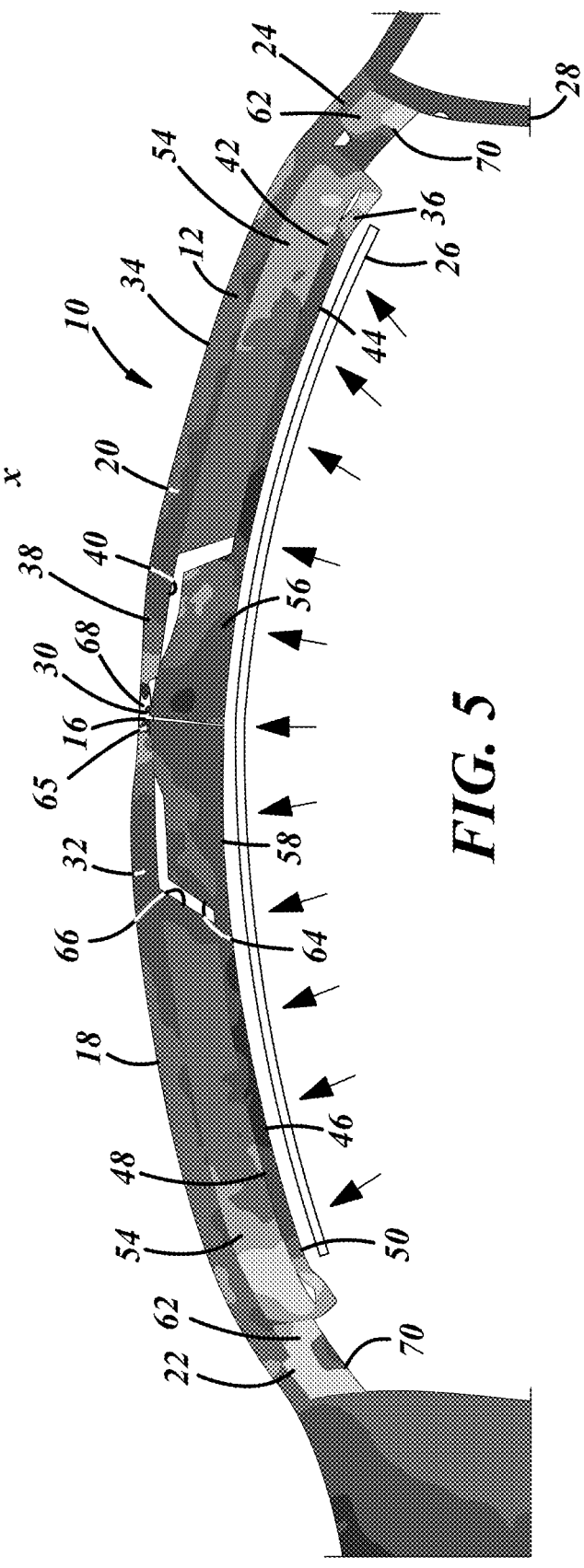
FIG. 4
FIG. 5

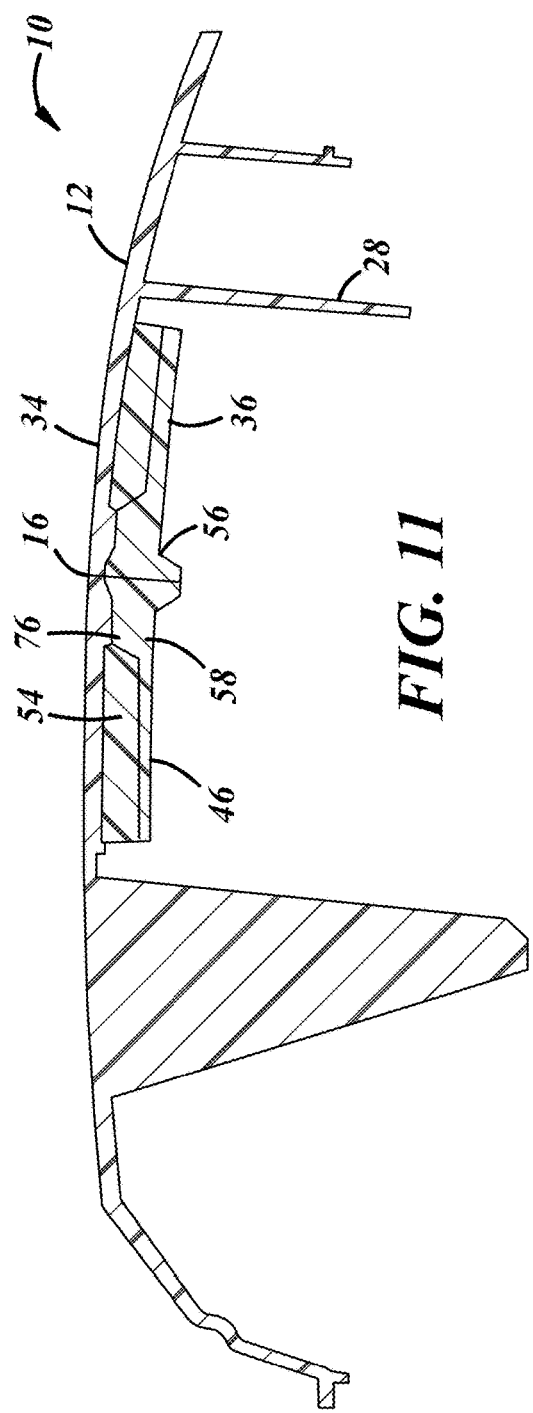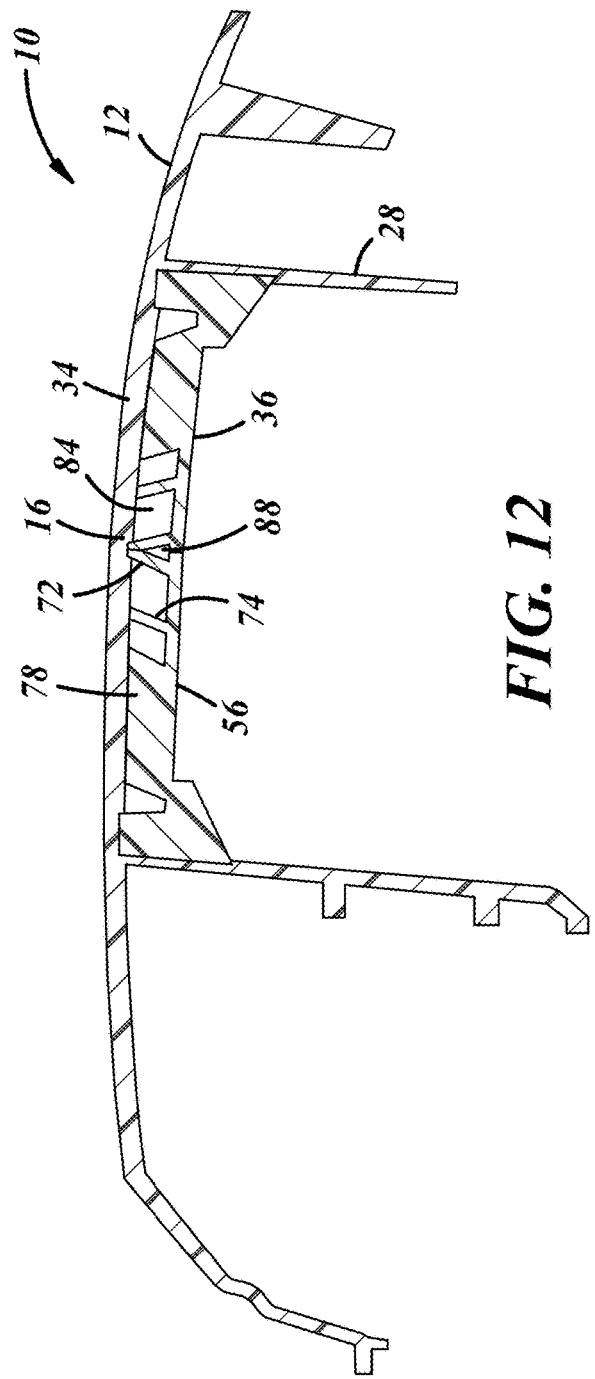

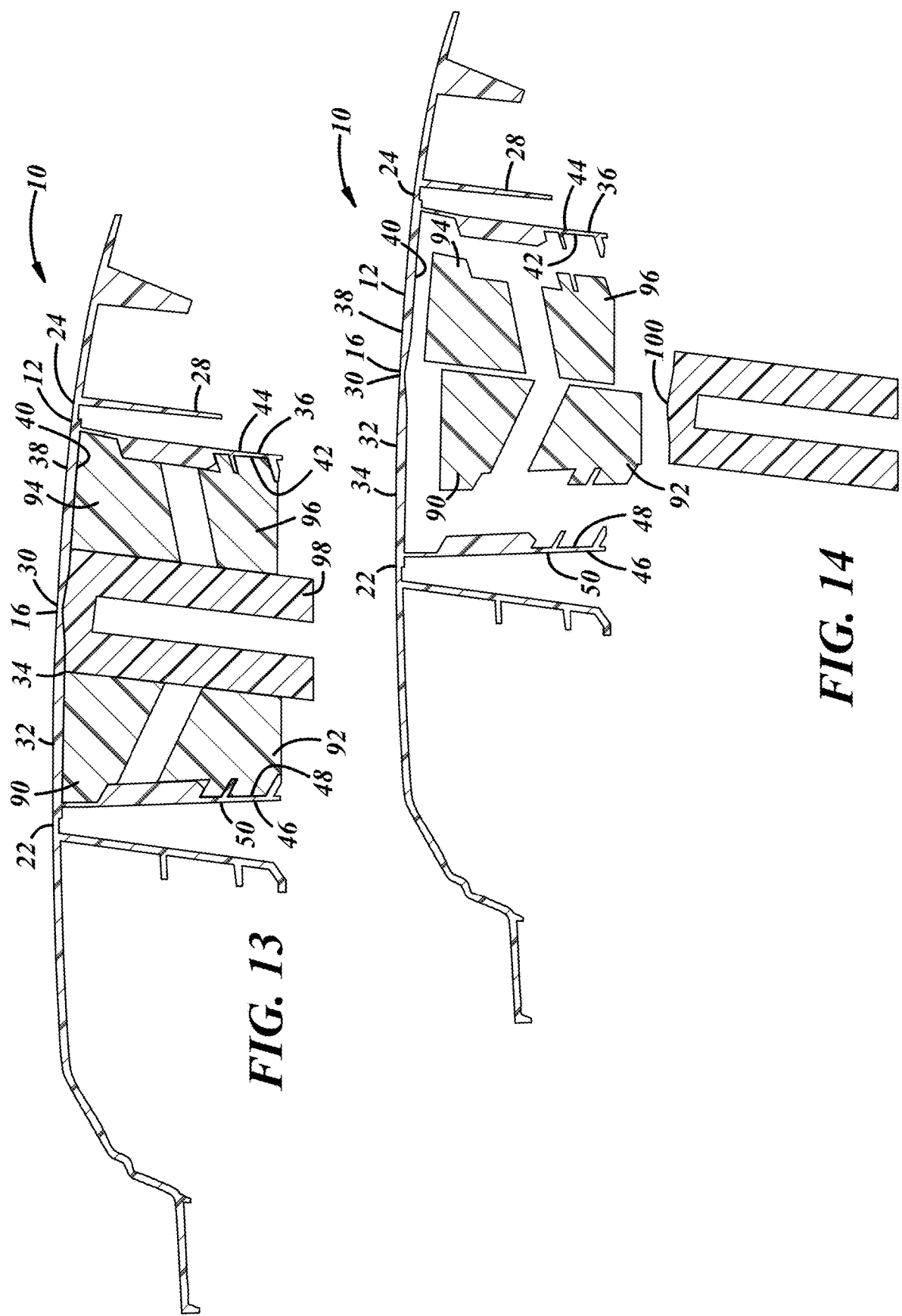

US 11,932,193 B1

VEHICLE INTERIOR PANEL FOR USE OVER A DEPLOYABLE AIRBAG AND METHOD OF MANUFACTURING

TECHNICAL FIELD

The present disclosure is related generally to vehicle interior panels and, more particularly, to vehicle interior panels through which an airbag can deploy.

BACKGROUND

Airbags are commonly employed safety devices in vehicle interiors, but their presence is often entirely unknown to vehicle occupants until deployed in the event of a relatively severe collision. This is because undeployed airbags are hidden from view, typically behind a decorative panel that provides the passenger cabin of the vehicle with a desired aesthetic by concealing other vehicle components that are strictly utilitarian. Some decorative panels are specifically designed so that an opening is formed through the panel during airbag deployment at a location where only a solid surface was apparent before airbag deployment. A continual challenge for vehicle interior manufacturers has been providing a panel through which a deployment opening can be successfully formed while also making the future location of the opening invisible to vehicle occupants. To solve this challenge, pre-weakening processes are often used, such as laser scoring or milling, to create a tear seam. However, these processes require extra manufacturing after the panel is molded. In one example, U.S. Pat. No. 7,165,780 to Segura discloses weakened areas that can be added to the panel to help promote door development during deployment.

SUMMARY

An illustrative vehicle interior panel for use over a deployable airbag includes an outer substrate portion having a top side, a bottom side, a tear seam, and a structural rib extending from the bottom side of the outer substrate portion. The panel includes an inner substrate portion having a top side, a bottom side, and a deflector extending from the top side of the inner substrate portion, wherein the deflector is configured to contact the structural rib and the tear seam during deployment of the airbag.

In various embodiments, the panel comprises a second inner substrate portion. The second inner substrate portion has a top side, a bottom side, and a second deflector extending from the top side of the second inner substrate portion.

In various embodiments, the second deflector is configured to contact a second structural rib on the outer substrate portion.

In various embodiments, the inner substrate portion and the second inner substrate portion are each connected to the outer substrate portion at respective hinge regions.

In various embodiments, the deflector and the second deflector each have a longitudinal projection, and wherein the longitudinal projection of the deflector and the longitudinal projection of the second deflector create a triangle-shaped aperture.

In various embodiments, the outer substrate portion has a nominal thickness adjacent the structural rib and a reduced thickness area at the tear seam.

In various embodiments, the deflector includes a lateral projection.

In various embodiments, the deflector includes a first longitudinal projection that extends along a length of the tear seam and a second longitudinal projection that is located closer to a hinge region. A plurality of lateral projections are located between the first longitudinal projection and the second longitudinal projection.

In various embodiments, the panel comprises a plurality of structural ribs, and each lateral projection of the plurality of lateral projections is at least partially aligned with each structural rib of the plurality of structural ribs.

In various embodiments, the structural rib has an angled lateral contact edge and the deflector has an angled lateral contact edge. The angled lateral contact edges are configured to contact each other during airbag deployment.

In various embodiments, the panel comprises a plurality of stiffening ribs extending from the top surface of the inner substrate portion.

In various embodiments, the panel comprises a plurality of structural ribs. The plurality of structural ribs and the plurality of stiffening ribs are alternating along a longitudinal extent of the panel.

In various embodiments, each stiffening rib of the plurality of stiffening ribs includes first and second free ends on either end of a longitudinal extent of each stiffening rib.

In various embodiments, the panel comprises a plurality of tear seam projections adjacent the tear seam.

In various embodiments, the panel is manufactured in accordance with the method of: injecting the outer substrate portion with the inner substrate portion; and folding the inner substrate portion at a hinge region toward the outer substrate portion.

It is contemplated than any of the above-listed features can be combined with any other feature or features of the above-described embodiments or the features described below and/or depicted in the drawings, except where there is an incompatibility of features.

BRIEF DESCRIPTION OF THE DRAWINGS

Illustrative embodiments will hereinafter be described in conjunction with the following figures, wherein like numerals denote like elements, and wherein:

FIG. 2 is a cross-sectional view of the vehicle interior panel of FIG. 1, illustrating a configuration of the panel before deployment;

FIG. 3 is a cross-sectional view of the vehicle interior panel of FIG. 1, illustrating a configuration of the panel near the beginning of deployment;

FIG. 4 is a cross-sectional view of the vehicle interior panel of FIG. 1, illustrating a configuration of the panel after the beginning of deployment but before the tear seam is broken;

FIG. 5 is a cross-sectional view of the vehicle interior panel of FIG. 1, illustrating a configuration of the panel just before the tear seam is broken;

FIG. 11 is a cross-section view taken along line 11-11 in FIG. 9;

FIG. 12 is a cross-section view taken along line 12-12 in FIG. 9;

FIG. 13 is a schematic, cross-sectional view of the vehicle interior panel of claim 1 during manufacture; and FIG. 14 is another schematic, cross-sectional view of the vehicle interior panel of claim 1 during manufacture.

DESCRIPTION OF ILLUSTRATIVE EMBODIMENTS

Described herein is a vehicle interior panel configured to advantageously manage stresses applied to the panel by an inflating airbag to improve tear seam function and airbag door formation. Most panels that are used with airbags require extra manufacturing, as a weakening process such as milling, laser scoring, cold knifing, etc. must be employed to help promote tear seam functionality. The vehicle interior panels disclosed herein can be manufactured without this additional weakening, allowing emergence of the airbag from the panel without holes, weakened areas, etc. being needed at the tear seam. Moreover, the vehicle interior panels disclosed herein can maintain their non-visibility of the substrate through a decorative covering or the like, by maintaining a requisite thickness yet still being able to successfully open during deployment. Additionally, many airbag unfolding variations can be used with the present panel implementations.

Figure 1:
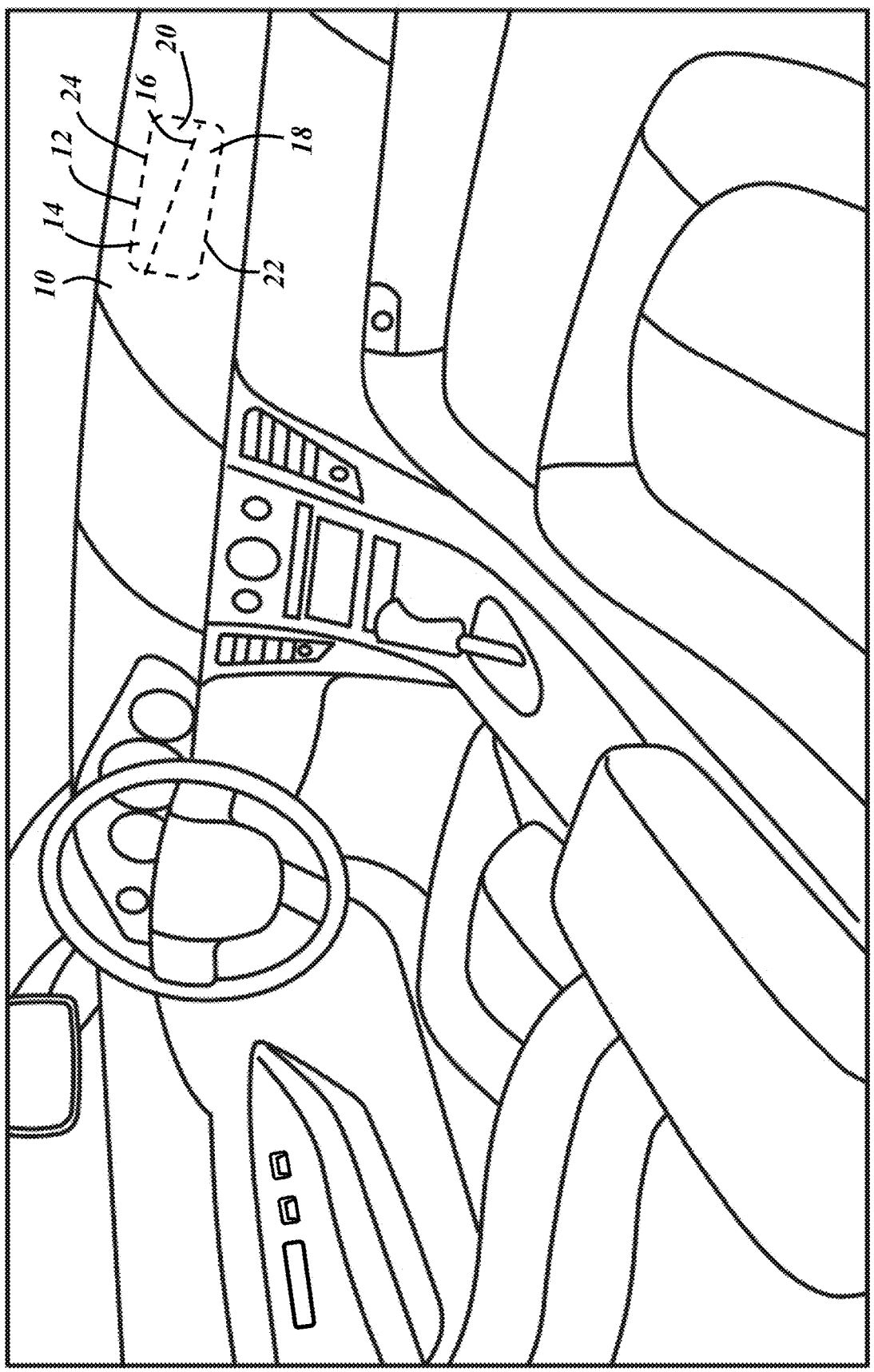
FIG. 1 is a perspective view of a portion of a vehicle interior panel configured to split along a tear seam during deployment of an underlying airbag.

FIG. 1 is a perspective view of a portion of a vehicle interior panel 10 for use over a deployable airbag. The illustrated panel 10 is intended for use on the passenger side of a vehicle instrument panel as illustrated, but the following description is applicable to any vehicle interior panel, such as that of a vehicle door, steering wheel, console, roof, pillar, seat, etc. The panel 10 includes an underlying substrate 12 and a decorative covering 14. FIG. 1 also shows in dotted lines a tear seam 16 that separates two doors 18, 20 which bend at corresponding hinge regions 22, 24 upon deployment of the airbag and splitting of the tear seam. It is feasible for the panel 10 and the doors 18, 20 to be alternately configured beyond that which is explicitly illustrated. For example, instead of having the tear seam 16 angled to help avoid the door 20 from contacting the windshield, the tear seam could be straight across or have a different shape.

The substrate 12 provides the overall size and shape of the panel 10 and is sufficiently rigid to maintain its shape in a vehicle interior. Example substrates are made from, or include, injection molded materials such as semi-rigid thermoplastic materials (e.g., filled or unfilled polyolefins or thermoplastic elastomers) having a nominal thickness in a range from 1.0 mm to 4.0 mm. As will be detailed below, in an advantageous embodiment, the substrate 12 has a reduced thickness portion of about 0.7 to 1.5 mm, or more particularly 1.2 mm. at the tear seam 16 and can be thicker at other locations along the panel 10.

The decorative covering 14 provides the panel 10 with a desired aesthetic and may be a multilayer component including an outer decorative layer (e.g., leather, simulated leather, fabric, etc.) that faces the interior of the passenger cabin of the vehicle when installed and one or more underlying layers, such as an elastic foam layer that provides the panel with a cushion-like character. The covering 14 can be provided as a one-piece upholstery-like component separately from the substrate 12 and then attached to the substrate, or a portion of the covering such as a foam layer can be formed in place between the decorative layer and the substrate during assembly of the panel 10. The covering 14 can be a simpler decorative layer, such as a single layer of paint or film, or more complex layer, such as a touch sensitive or illuminated thin film device, to cite a few examples.

FIGS. 2-5 schematically illustrate the deployment process of an airbag 26 out of the panel 10 (with the decorative covering 14 not shown). In this example, the deployable airbag 26 is housed in a canister beneath the substrate 12 and adjacent to a chute 28, which is partially illustrated. The airbag 26 is in a deflated state and configured to inflate in a vehicle collision, and the chute 28 restricts airbag inflation to a direction toward the passenger cabin. The chute 28 may be integrally formed as one injection-molded piece with the substrate 12, as shown. Alternatively, the chute 28 may be formed separately from the substrate 12 and can be attached to an inner side of the substrate via flange or some other attachment mechanism. One advantage of the present embodiments is that it is possible to form the panel 10 with the airbag 26 and hinge reinforcement nets are not required given the controllability of opening along the tear seam 16.

The panel 10 includes a tear seam 16 formed in the substrate 12 and a hinge region 22, 24 on either side of each door 18, 20. In the illustrated examples, the tear seam 16 has a reduced thickness area 30 which is thinner than a nominal thickness area 32 at other areas along the substrate 12. This reduced thickness area 30 is advantageously integrally molded in as opposed to being separately formed or machined. Further, the tear seam 16 may not have a noticeable structure (e.g., the reduced thickness area) until the airbag is deployed. In such an embodiment, the tear seam 16 may be an area in the substrate 12 where one or more airbag doors 18, 20 are configured to be formed. Airbag inflation forces are concentrated at much higher stresses near the tear seam 16 than away from the tear seam so that the substrate 12 splits along the tear seam during airbag deployment to form airbag doors 18, 20 on either side of the tear seam. Each hinge region 22, 24 includes a notch to help reduce thickness, and a plurality of hinge ribs to help reinforce the area and promote bending of the hinge region as opposed to breaking.

The illustrated configurations and shapes of the panel 10 are non-limiting. For example, while it is advantageous that the tear seam 16 not include mechanically weakened areas that are formed after injection molding the substrate 12, it is possible for the tear seam 16 to include or be formed from a series of through-openings in the substrate, a series of blind laser-formed holes, or any other suitable feature that causes the substrate to split along that feature to form the airbag door(s). The substrate 12 may also be configured to split along each hinge region 22, 24 but can include tethers that anchor the airbag doors 18, 20 to the remainder of the substrate at the hinge. Different tear seam shapes, such as H-shaped, X-shaped, Y-shaped, or curvilinear shapes are also possible. An X-shaped tear seam, for example, may be used to form four triangular airbag doors with their apexes at the center of the X-shape, for example. One or more layers of the covering 14 may include a tear seam as well.

The panel 10 includes an outer substrate portion 34 and an inner substrate portion 36 that together make up the substrate 12. The outer substrate portion 34 includes the tear seam 16, as well as a top side 38 and a bottom side 40. As used herein, "top" or "outer" and "bottom" or "inner"

generally refer to closer to the vehicle cabin (A-side) and further from the vehicle cabin (B-side), respectively. The inner substrate portion 36 also includes a top side 42 and a bottom side 44. The illustrated embodiment also includes second inner substrate portion 46 having a top side 48 and a bottom side 50. The inner substrate portion 36 is joined to the outer substrate portion 34 at the hinge region 24, and the second inner substrate portion 46 is joined to the outer substrate portion 34 at the hinge region 22. More particularly in this embodiment, the inner substrate portions 36, 46 are integrally molded with the outer substrate portion 34 such that a separate joining mechanism or the like is not needed. In this embodiment, a gap 52 exists between the outer substrate portion 34 and the inner substrate portions 36, 46 before deployment (see e.g., FIG. 2) and at least partially during deployment (see e.g., FIGS. 3 and 4). Given the pressure from the airbag 26, typically just before deployment and splitting of the tear seam 16, the gap 52 is closed (see e.g., FIG. 5).

The outer substrate portion 34 has a plurality of structural ribs 54 extending from the bottom side 40 on either side of the tear seam 16. The first inner substrate portion 36 and the second inner substrate portion 46 each have a deflector 56, 58 that extends from the top sides 42, 48 of each inner substrate portion 36, 46 toward the bottom side 40 of the outer substrate portion 34. As shown in FIG. 2, a gap 60 exists between the deflectors 56, 58 before deployment, and quickly is closed during deployment (see e.g. FIGS. 3-5). With particular reference to FIGS. 3-5, during deployment of the airbag 26, the deflectors 56, 58 are configured to contact the structural ribs 54 and the tear seam 16 to ultimately concentrate the force at the tear seam to split the outer substrate portion 34. This ultimately forms airbag doors 18, 20 that hinge open for deployment of the airbag 26 into the passenger cabin of the vehicle.

As shown in FIG. 3, when the airbag 26 begins deployment, high stress areas 62 are located in each of the deflectors 56, 58. This pushes each of the deflectors 56, 58 both up toward the tear seam 16 (Z-direction) and laterally toward each of the structural ribs 54 (X-direction). Since contact of the airbag 26 with the substrate 12 generates forces mainly in the Z-direction that act on the bottom or B-side, the resulting collision of the deflectors 56, 58 with the structural ribs 54 creates a newly located extra tensile effort through the transformation of the Z-displacement of the substrate 12 (normally in the center area near the tear seam 16) to an X-direction effort (or in a component with higher influence in the X-direction). This collision occurs between an angled lateral contact edge 64 on each of the deflectors 56, 58 and an angled lateral contact edge 66 on each of the structural ribs 54. The angled lateral contact edges 64, 66 are not orthogonal or parallel with respect to the orientation of the outer and inner substrate portions 34, 36, 46 before deployment is initiated. Additionally, the deflectors 56, 58 may also have an angled contact edge 65 that is not orthogonal or parallel with respect to the orientation of the outer and inner substrate portions 34, 36, 46. Only one angled contact edge 64, 65, 66 is labeled in each of FIGS. 2-5 for clarity purposes. The angled contact edges 65 of the deflectors 56, 58 help to create an apex for contacting the tear seam 16. Additionally, the angled arrangement of the contact edges 64, 65, 66 can help with the transmission of forces.

FIG. 4 shows the lateral collision between the deflectors 56, 58 and the structural ribs 54. This transmission of force in the X-direction can help produce an addressed zone of tensile opening effort which can accelerate the stress concentration in the tear seam 16. This helps create a time-shortened opening of the panel 10 and helps to avoid undue tensile stress accumulation on the hinge regions 22, 24. As shown in FIG. 5, just prior to formation of the tear seam 16, the high stress areas 62 are at the hinge regions 22, 24, with the highest stress area 68 being located at the tear seam. During opening, hinge ribs 70 can help disperse the tensile stress in at least a 300% larger area, which transforms that tensile effort into a bending stress. This can then increase the channel strength of the chute 28 during rotation of the doors 18, 20.

Figure 6:
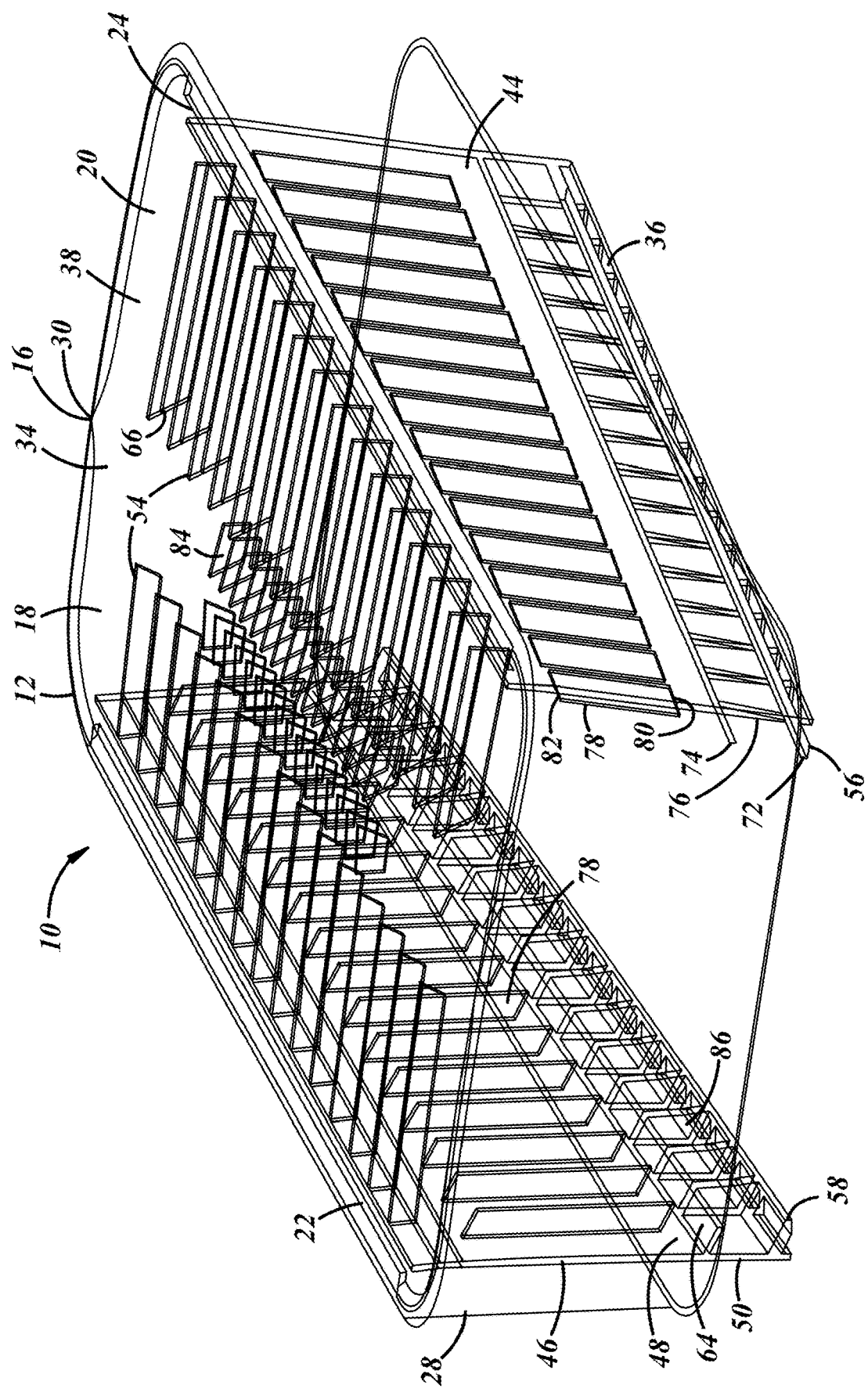
FIG. 6 is a perspective view through the vehicle interior panel of FIG. 1, showing the inner substrate portions before they are folded into place.
Figure 7:
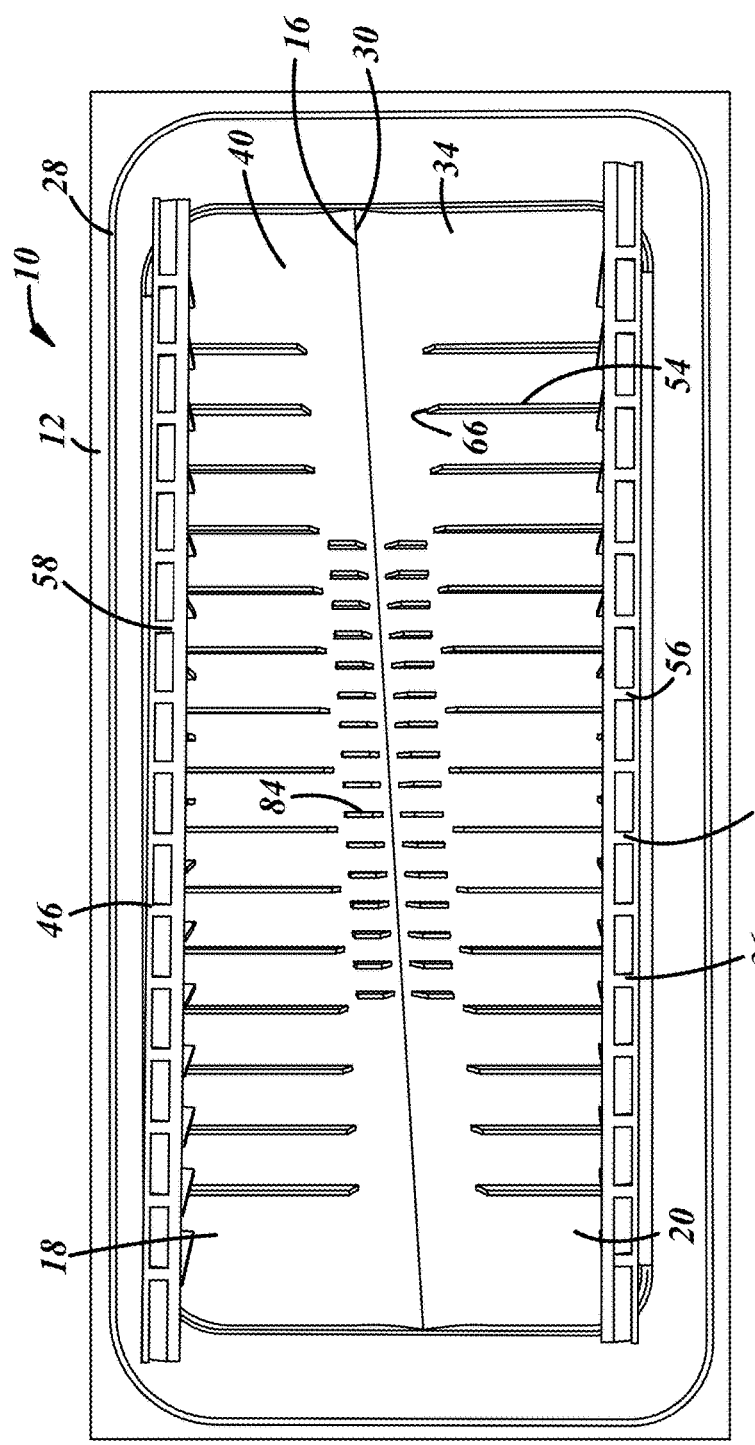
FIG. 7 is a bottom view of the outer substrate portion of the vehicle interior panel of FIG. 1.
Figure 10:
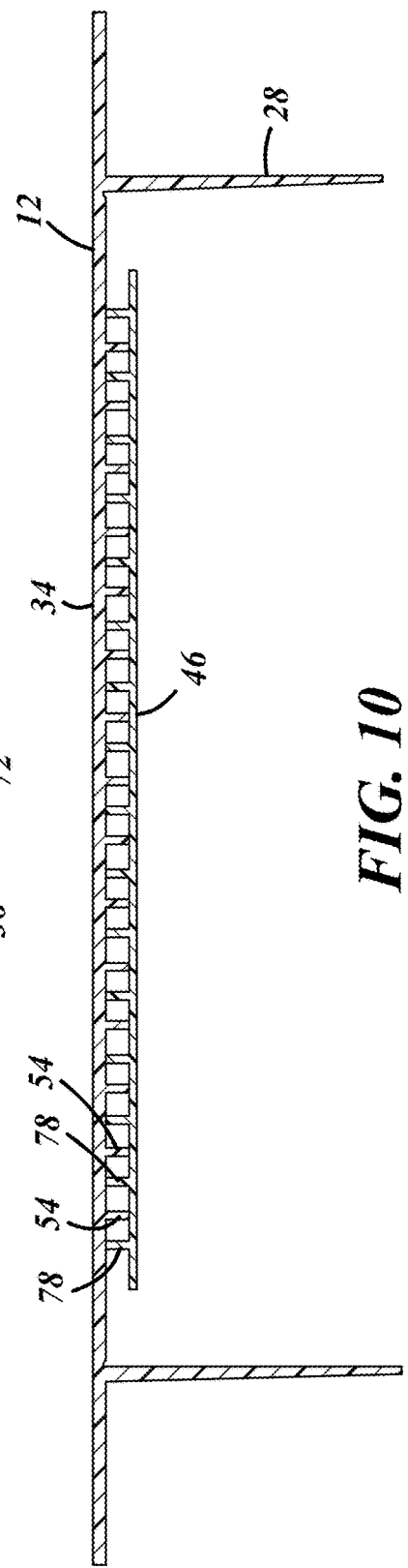
FIG. 10 is a cross-section view taken along line 10-10 in FIG. 9.
Figure 8:
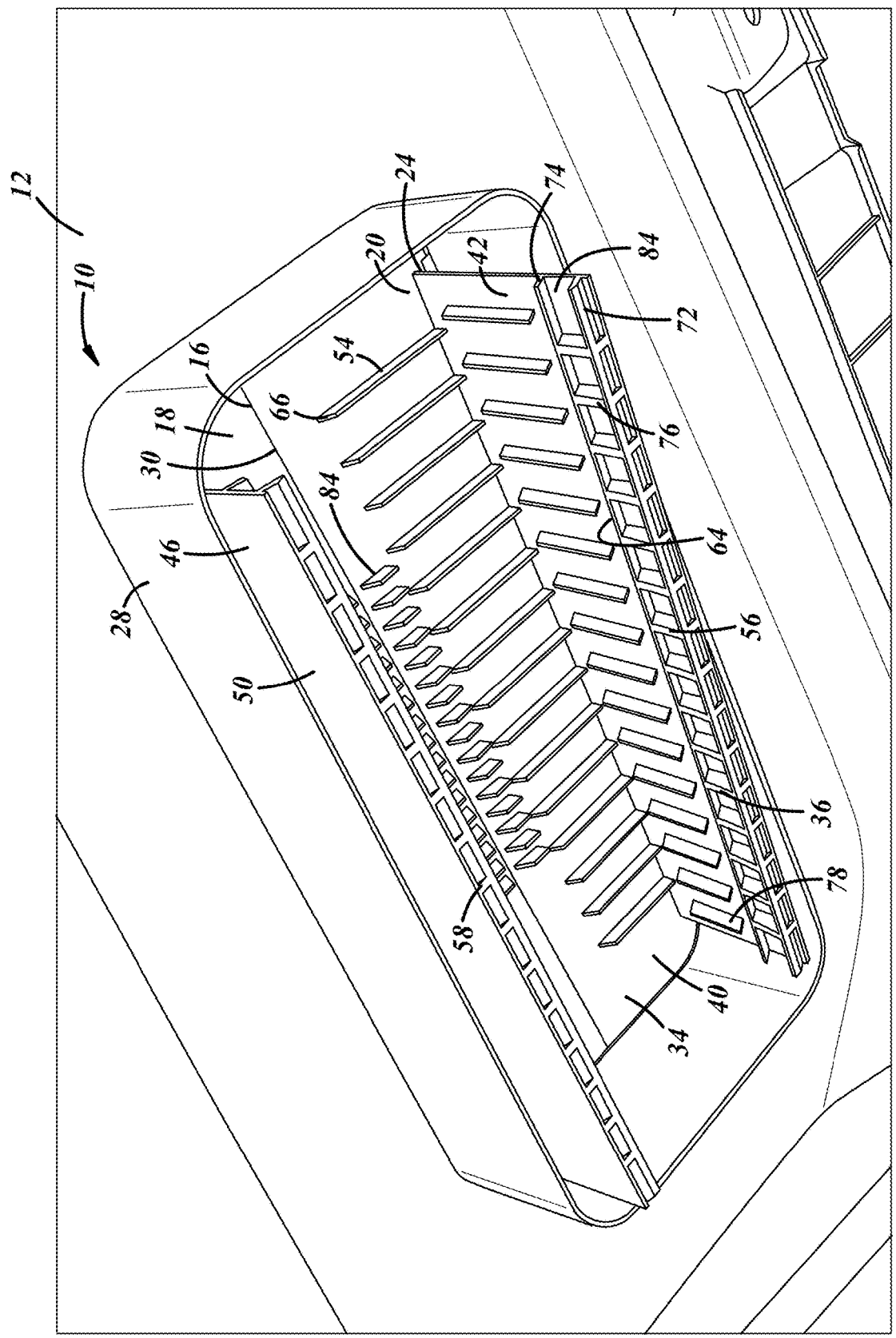
FIG. 8 is a perspective bottom view of the outer substrate portion including the inner substrate portions before they are folded into place.

FIGS. 6-8 illustrate an example of the structural rib 54 and deflector 56, 58 structure. In FIGS. 6-8 the inner substrate portions 36, 46 are shown in their position after injection molding but before being folded into place adjacent the outer substrate portion 34 (as shown in FIGS. 2-5). Each deflector 56, 58 includes a first longitudinal projection 72 that extends along a length of the tear seam 16 and a second longitudinal projection 74 that also extends along a length of the tear seam, but is located closer to the respective hinge region 24 (only the subcomponents of one deflector 56 are labeled for clarity purposes). A plurality of lateral projections 76 are located between each of the first and second longitudinal projections 72, 74 (only one lateral projection is labeled for clarity purposes). The lateral projections 76 in this embodiment directly connect each of the longitudinal projections 72, 74 and serve to form a more solid bearing surface or lateral contact edge 64 for interfacing with and directly contacting each structural rib 54. Accordingly, it is desirable for the lateral projections 76 to be aligned with each structural rib 54.

With reference to FIGS. 6-12, it is also possible for one or more of the substrate portions 34, 36, 46 to have other ribs or projections to assist in proper deployment functioning. In the illustrated embodiments, each of the inner substrate portions 36, 46 include a plurality of stiffening ribs 78 (not all labeled for clarity purposes) that extend from the top surfaces 42, 48 of each inner substrate portion. As shown in FIGS. 6 and 8, and the cross-section view of FIG. 10, the stiffening ribs 78 are alternating between the structural ribs 54 in a 1:1 ratio along a length of the panel 10 (the length of the panel being the longest dimension and is often aligned with tear seam 16). Additionally, each stiffening rib 78 has first and second free ends 80, 82. This makes each stiffening rib 78 a stand-alone structure, which can help impart the requisite stiffening of each door 18, 20 during deployment.

As shown more particularly in FIG. 7, a plurality of tear seam projections 84 are located adjacent the tear seam 16. These may be included to help promote additional stiffness and stress concentration at the tear seam 16. The tear seam projections 84 are advantageously distributed symmetrically on either side of the tear seam 16 and project from the bottom 40 of the outer substrate portion 34. In the illustrated embodiment, the tear seam projections 84 are disbursed in a 2:1 ratio with respect to the structural ribs 54. Thus, there are two tear seam projections 84 located between two adjacent structural ribs 54. Additionally, the tear seam projections 84 are located only between a central subset of the structural ribs 54, not between all of the structural ribs. The amount of tear seam projections 84, if included, may depend on the size and length of the tear seam 16.

Figure 9:
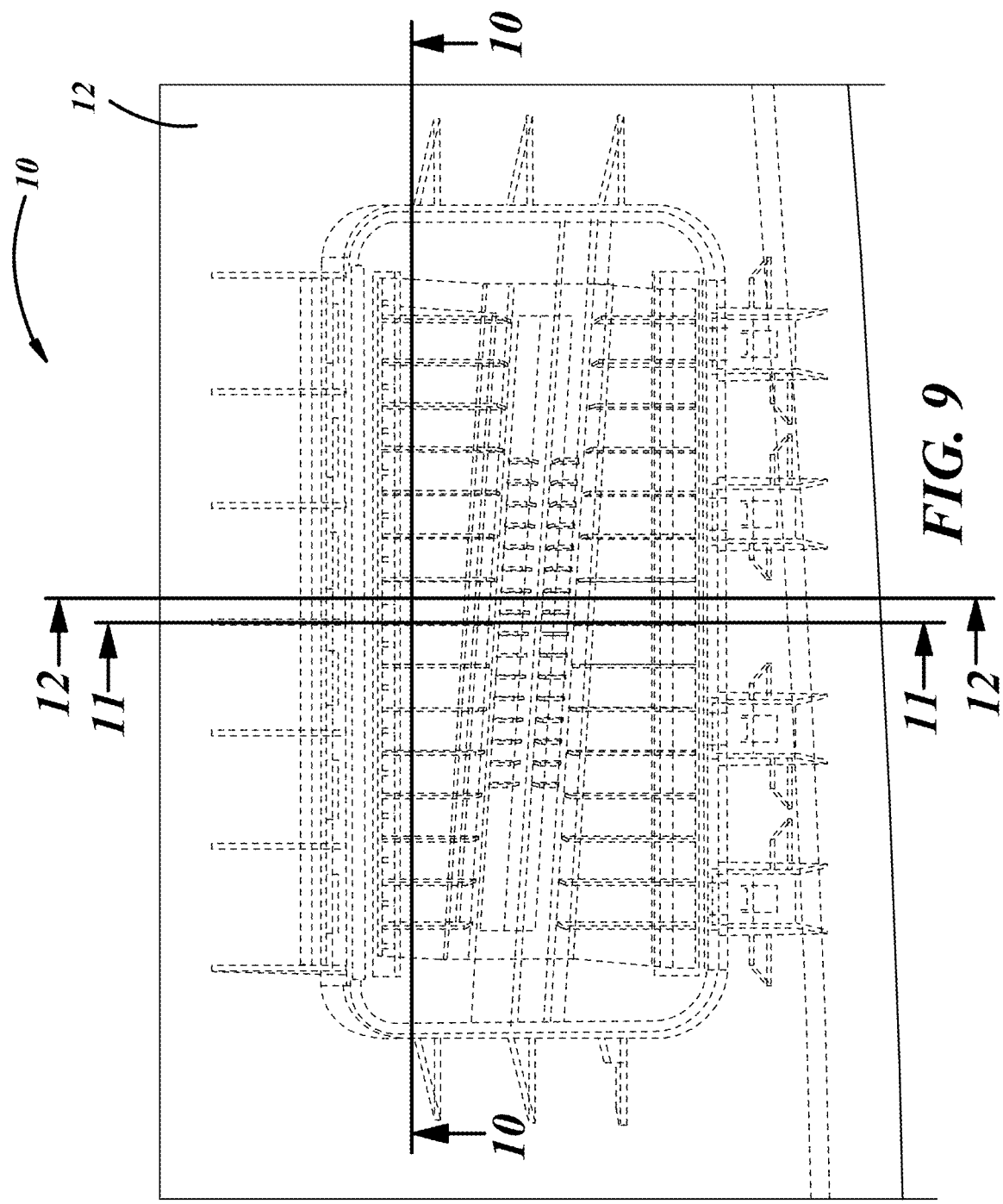
FIG. 9 is a bottom view of the substrate of the vehicle interior panel of FIG. 1.

FIGS. 11 and 12 show different cross-sectional views of the panel, with FIG. 11 representing the panel 10 of FIG. 9 through the line 11-11, and FIG. 12 representing the panel 10 of FIG. 9 through the line 12-12. FIG. 11 is similar to the representations in FIGS. 2-5, showing a cut through the lateral projections 76 in the deflectors 56, 58. FIG. 12, on the other hand, is taken through the open portion 86 between the first and second longitudinal projections 72, 74. The open portions 86 can accommodate the tear seam projections 84, and as can be seen in this view, both the first and second longitudinal projections 72, 74 are angled toward the tear seam 16. This creates a triangle shaped aperture 88 which can help direct contact of the deflectors 56, 58 to the tear seam 16. It should be understood that the various deflectors, ribs, and projections may be alternately shaped or configured beyond what is particularly illustrated. For example, the tear seam projections 84 may be omitted, or the first and second longitudinal projections 72, 74 may not be distinct (e.g., without open portions 86 which help form the lateral projections 76), to cite just a few examples.

FIGS. 13 and 14 schematically illustrate portions of the manufacturing process for the panel 10. Advantageously, the outer substrate portion 34 is integrally co-molded with the inner substrate portions 36, 46 using one or more tool sliders 90, 92, 94, 96, 98. The sliders 90, 92, 94, 96, 98 can help create the various projections, ribs, etc. in the panel 10. Additionally, as shown more clearly in FIG. 14, the slider 98 may include an apex 100 to help form the reduced thickness area 30 at the tear seam 16 while helping to maintain a nominal thickness 32 at other areas along the outer substrate portion 34. The inner substrate portions 36, 46 end up being formed as an integral or unitary piece with the outer substrate portion 34 such that they extend down adjacent the chute 28 at the hinge regions 22, 24. After co-molding the substrate 12 having the outer substrate portion 34 and the inner substrate portions 36, 46, the inner substrate portions can be bent or otherwise orientated generally orthogonally to their molding position such that the top sides 42, 48 of the inner portions directly face against the bottom side 40 of the outer substrate portion. In some embodiments, one or more fasteners may be used to keep the inner substrate portions 36, 46 in their folded position. Separately or additionally, general fixations for the inner and outer substrate portions 34, 36, 46 could also include welding, clipping, gluing, sewing, screwing, etc.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering all the following: "A"; "B"; "C"; "A and B"; "A and C"; "B and C"; and "A, B, and C."

The invention claimed is:

1. A vehicle interior panel for use over a deployable airbag, the panel comprising:
    an outer substrate portion having a top side, a bottom side, a tear seam, and a structural rib extending from the bottom side of the outer substrate portion; and
    an inner substrate portion having a top side, a bottom side, and a deflector extending from the top side of the inner substrate portion, wherein the deflector is configured to contact the structural rib and the tear seam during deployment of the airbag.

2. The vehicle interior panel of claim 1, comprising a second inner substrate portion, wherein the second inner substrate portion has a top side, a bottom side, and a second deflector extending from the top side of the second inner substrate portion.

3. The vehicle interior panel of claim 2, wherein the second deflector is configured to contact a second structural rib on the outer substrate portion.

4. The vehicle interior panel of claim 2, wherein the inner substrate portion and the second inner substrate portion are each connected to the outer substrate portion at respective hinge regions.

5. The vehicle interior panel of claim 2, wherein the deflector and the second deflector each have a longitudinal projection, and wherein the longitudinal projection of the deflector and the longitudinal projection of the second deflector create a triangle-shaped aperture.

6. The vehicle interior panel of claim 1, wherein the outer substrate portion has a nominal thickness adjacent the structural rib and a reduced thickness area at the tear seam.

7. The vehicle interior panel of claim 1, wherein the deflector includes a lateral projection.

8. The vehicle interior panel of claim 7, wherein the deflector includes a first longitudinal projection that extends along a length of the tear seam and a second longitudinal projection that is located closer to a hinge region, wherein a plurality of lateral projections are located between the first longitudinal projection and the second longitudinal projection.

9. The vehicle interior panel of claim 8, comprising a plurality of structural ribs, and wherein each lateral projection of the plurality of lateral projections is at least partially aligned with each structural rib of the plurality of structural ribs.

10. The vehicle interior panel of claim 1, wherein the structural rib has an angled lateral contact edge and the deflector has an angled lateral contact edge, and wherein the angled lateral contact edges are configured to contact each other during airbag deployment.

11. The vehicle interior panel of claim 1, comprising a plurality of stiffening ribs extending from the top side of the inner substrate portion.

12. The vehicle interior panel of claim 11, comprising a plurality of structural ribs, wherein the plurality of structural ribs and the plurality of stiffening ribs are alternating along a longitudinal extent of the panel.

13. The vehicle interior panel of claim 11, wherein each stiffening rib of the plurality of stiffening ribs includes first and second free ends on either end of a longitudinal extent of each stiffening rib.

14. The vehicle interior panel of claim 1, comprising a plurality of tear seam projections adjacent the tear seam.

15. A method of manufacturing the vehicle interior panel of claim 1, comprising the steps of:
    injecting the outer substrate portion with the inner substrate portion; and folding the inner substrate portion at a hinge region toward the outer substrate portion.

\* \* \* \* \*